(No Model.)
A. SHELMERDINE.
TILE.
No. 572,454. Patented Dec. 1, 1896.
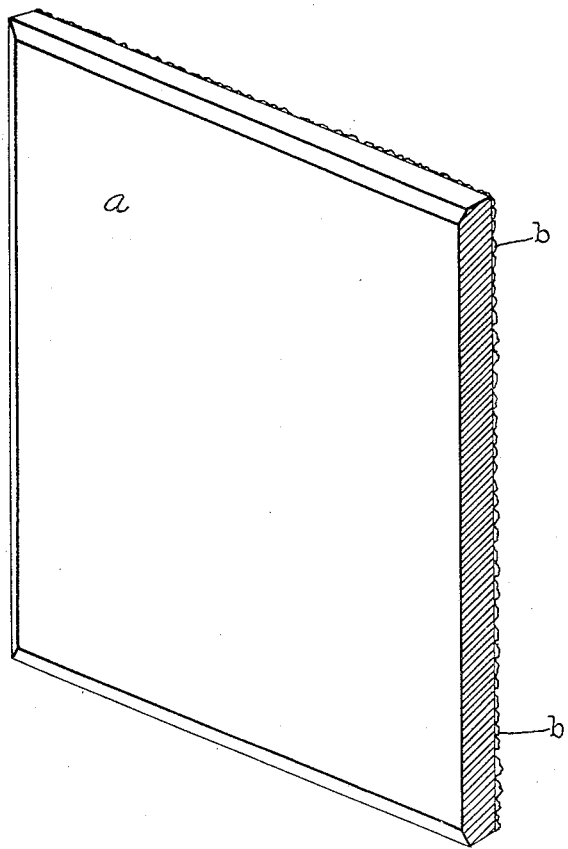
WITNESSES:
F. W. Wright.
N. C. Connor
INVENTOR.
Anthony Shelmerdine
BY
Howson & Howson
ATTORNEYS.

United States Patent Office.

ANTHONY SHELMERDINE, OF LIVERPOOL, ENGLAND, ASSIGNOR TO THE NATIONAL OPALITE GLAZED BRICK AND TILE SYNDICATE, LIMITED, OF LONDON, ENGLAND.

TILE.

SPECIFICATION forming part of Letters Patent No. 572,454, dated December 1, 1896.

Application filed October 24, 1895. Serial No. 566,769. (No specimens.) Patented in England June 26, 1893, No. 12,472.

*To all whom it may concern:*

Be it known that I, ANTHONY SHELMERDINE, a subject of the Queen of Great Britain and Ireland, residing at Liverpool, in the county of Lancaster, England, have invented Improvements in Connection with Fancy or Ornamental Bricks, Tiles, Slabs, Wallings, Ceilings, and the Like, (for which I have obtained Letters Patent in Great Britain, No. 12,472, dated June 26, 1893,) of which the following is a specification.

This invention has mainly for its object to produce improved or improvements in connection with fancy or ornamental tiles, bricks, slabs, wallings, ceilings, or other surfaces, whereby such surface or surfaces made of said bricks, tiles, or slabs may be rendered pleasing in effect, smooth, cleanly, and relatively inexpensive, as well as being generally useful as surfacing material or articles.

According to this invention I produce bricks, tiles, or slabs, or surfaces such as specified, by providing on that part presented to view a facing or face consisting of a thin tablet or tablets or piece or pieces of "opal" or colored or partly-colored glass or pot-glass, said facing or face being made to adhere, by cement or equivalent adhesive, to its backing (that is, brick, stone, cement, plaster, or other materials, as the case may be) by having or being provided with a rough or granular back. This rough or granular or sanded back I produce by applying sand or granular material, as crushed or broken glass, on the back of the tablets or pieces of glass or other material and fixing it thereon by a fluxing material (such as glass-flux, for instance) under an artificial temperature. This may be done within a suitable stove, oven, or furnace, but below such a temperature as will injuriously affect the nature of said glass or tablets or pieces. Thus under this invention the pieces or tablets to be applied to the wallings, ceilings, or other surfaces, or to form the surface of the bricks, slabs, or the like, have the front surface even or smooth or of other nature or formation, while the back surface is rough or granular. These slabs or pieces of glass or other material herein described may be of any suitable form or shape, and in some cases the edges or parts of same may be beveled or have other special formation.

The form or nature of the bricks or the tablets or pieces render their adhesion to the bricks, blocks, wallings, ceilings, &c., firm and not liable to fall off from the same through atmospheric influences or be readily knocked or otherwise removed therefrom.

In carrying out the invention in the form I at present prefer I use as the backing to the tablets broken glass, say, which will stand about one-sixteenth of an inch, more or less, out from the back of the tablets, this broken glass being made to adhere thereto by a suitable fluxing material applied as above described. However, in different sizes of tablets or pieces of glass used the grains employed as the backing may be larger or smaller, but their size in relation to the thickness of glass used must not be such as to interfere with the proper cutting of a sheet with granular back into tablets.

The rough or granular back constitutes a "key" or is of the nature of a key, by which, when applied to the surface and adhered thereto by the cement used, a secure union or adhesion is effected.

In the accompanying drawing, $a$ is the tablet or piece having the rough or granular back $b$ of broken glass or sand applied and held thereon, as described. These tablets may be applied to existing plaster or cement surfaces, and also to brick walls, as well as to new surfaces.

In some cases I find that for tablets or pieces of the size of ordinary tiles used on walls and other surfaces about one-eighth of an inch will be of sufficient thickness in the case of opal or like glass being used.

I claim as my invention—

A slab or sheet of glass, as opal or colored or partly-colored glass, having a granular back, consisting of finely-broken glass or sand fixed thereon by a fluxing material.

In testimony whereof I have signed my name to this specification in the presence of two subscribing witnesses.

A. SHELMERDINE.

Witnesses:
JNO. HUGHES,
JOHN E. WOAN.